United States Patent [19]
Marsden

[11] 3,934,815
[45] Jan. 27, 1976

[54] FLUID CONTROL VALVES
[75] Inventor: John Thomas Marsden, Stoke-on-Trent, England
[73] Assignee: Expert Industrial Controls Ltd., England
[22] Filed: Mar. 27, 1975
[21] Appl. No.: 562,784

[30] Foreign Application Priority Data
Apr. 2, 1974 United Kingdom............... 14460/74

[52] U.S. Cl. ............................................. 251/129
[51] Int. Cl.² ......................................... F16K 31/06
[58] Field of Search .................................. 251/129

[56] References Cited
UNITED STATES PATENTS
3,327,264 6/1967 Rodaway ........................... 251/129

FOREIGN PATENTS OR APPLICATIONS
1,197,186 6/1959 France ............................... 251/129

Primary Examiner—Arnold Rosenthal
Attorney, Agent, or Firm—Kane, Dalsimer, Kane, Sullivan and Kurucz

[57] ABSTRACT

A fluid control valve includes a solenoid which controls the movement of an armature which has side plates. Movement of the armature is transmitted to a spring abutment having a head portion and the side plates of the armature are turned inwardly beneath the reduced heat portion of the spring abutment. The spring abutment effects operation of the stem of the valve.

4 Claims, 2 Drawing Figures

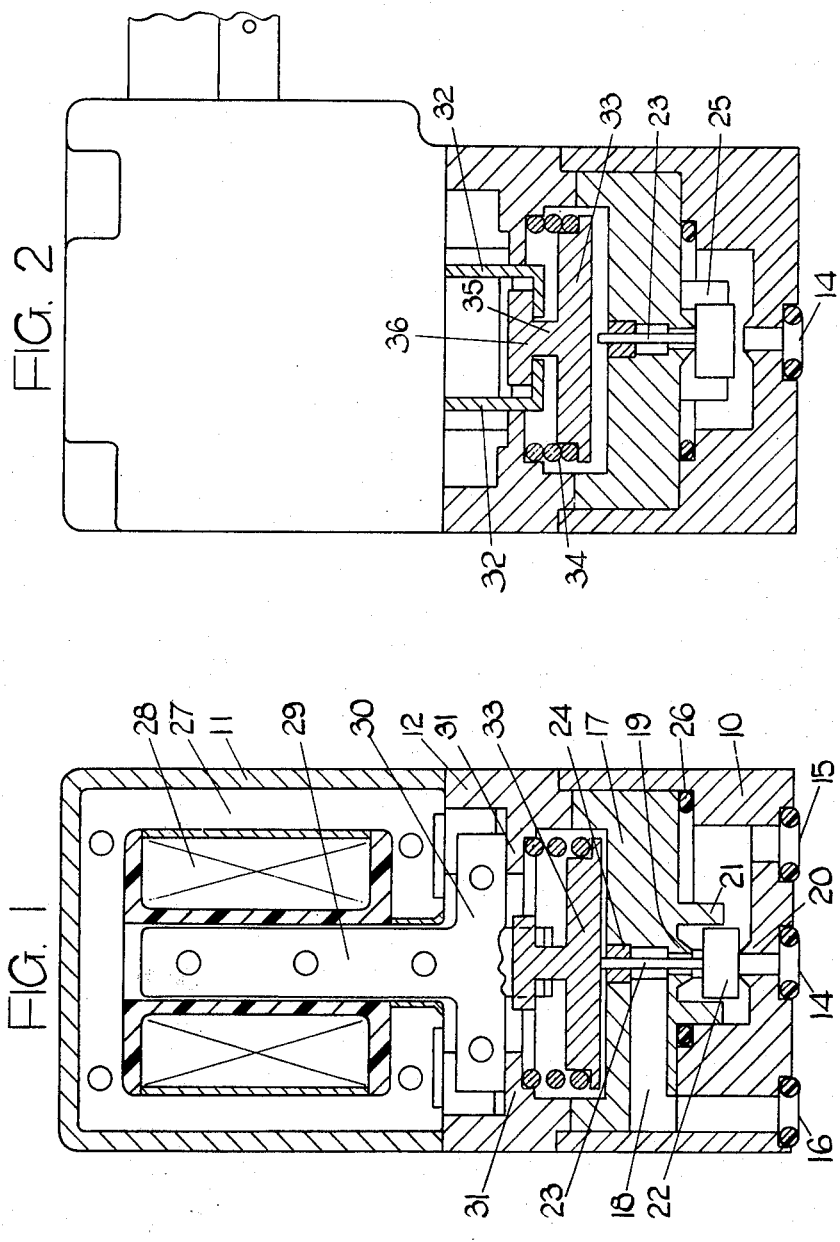

FLUID CONTROL VALVES

This invention relates to fluid-control valves.

In the specification of our British Pat. No. 1,217,838 there is described and claimed a fluid control valve comprising in combination, a valve housing defining a valve chamber, a pair of spaced opposed apertures opening into said chamber, seatings defined about said apertures respectively, one of said apertures in use, being in communication with a source of fluid under pressure and the other aperture communicating with a lower pressure, the chambr in use, communicating with a device which is to be supplied with the fluid under pressure, a valve member located within said chamber, resilient means acting to urge said valve member into contact with the seating about said one aperture, and electromagnetic means including an armature operable to reduce the force exerted by said resilient means, to permit when the valve is in use, the valve member to be moved by the fluid pressure out of contact with the seating about said one aperture and into contact with the seating about the other aperture thereby to allow fluid under pressure to be supplied to said device.

The object of the invention is to provide a fluid-control valve of the kind specified in a simple and convenient form.

According to the invention a fluid-control valve of the kind specified comprises a T-shaped armature, said armature having side plates, extensions on said side plates which extend beyond the head of the armature, the end portions of said extensions extending substantially at right angles to the remaining portions of the extensions, a spring abutment movable in the housing, a coiled compression spring defining said resilient means, said spring engaging said abutment to urge the abutment into contact with a stem on the valve member thereby to urge the valve member into contact with the seating defined about said one aperture, means carried by the abutment and engageable by the end portions of said extensions when in use electric current is supplied to a solenoid forming part of said electromagnetic means, the flow of current in the solenoid causing the armature to move the abutment in a direction away from the valve member to allow the valve member to be displaced by the air pressure, and stop means defined in the housing and which arrests the movement of the armature towards the valve member when the flow of electric current in the solenoid ceases.

According to a further feature of the invention said means carried by the abutment comprises a stem formed integrally with the abutment and a head formed on the stem, the thickness of said end portions of the extensions in relation to the distance between the head and the main body portion of the abutment being such that continued movement of the armature into contact with the stop can occur after the movement of the valve member and abutment has been arrested.

One example of a fluid control valve in accordance with the invention will now be described with reference to the accompanying drawings in which:

FIG. 1 is a sectional side elevation of the valve in its de-energised state, and FIG. 2 is a part-sectional elevation taken at right angles to FIG. 1 and showing the valve in an energised state.

Referring to the drawings, the valve comprises a valve housing 10, a solenoid housing 11 and a spring abutment housing 12 which is located between the housings 10 and 11. The three housings are secured in assembled relationship by means of a pair of through bolts (not shown) which engage with inserts located in the valve housing 10. The housings are of rectangular section and the valve housing has a flat outer end face which is provided with a central fluid inlet port 14, a port 15 which in use, is connected to the device for instance a piston cylinder combination, and a port 16 which serves as an exhaust port.

Located within the valve housing is a circular insert 17 which is located against angular movement by a peg (not shown). The insert 17 together with the valve housing are formed from synthetic resin material and formed in the insert 17 is a passage 18 which communicates with the port 16. The passage 18 terminates in a seating 19 and the port terminates in a further seating 20. The two seatings are presented to each other but are in spaced relationship. Moreover, the insert 17 is provided with an extension 21 defining an internal cylindrical recess in which is accommodated a valve member 22 formed from resilient material. The movement of the valve member 22 is guided by the cylindrical surface of the extension 21 and a stem 23 forms part of the valve member and is guided by a metal bush 24 which is moulded into the insert 17. In the position shown the valve member is urged against the seating 20 to prevent air from a source of supply connected to the port 14, flowing to the port 15. However, the port 15 communicates with the port 16 by way of the seating 19 and slots 25 which are formed in the extension 21. An annular sealing member 26 ensures a fluid-tight seal between the insert 17 and the valve housing 10. In the position shown in FIG. 2 the valve member has been allowed to move and it has been moved by the action of the air under pressure entering the port 14.

Mounted within the solenoid housing is a laminated core structure 27 which includes a winding 28 which is wound upon a former. Moreover, formed in the former is a rectangular elongated aperture in which is disposed the central limb 29 of a T-shaped armature having a head 30. The head 30 is located within a recess defined in the spring abutment housing 12 and a pair of stops 31 are provided to limit the movement of the armature towards the valve housing, the stops co-operating with the limbs of the head 30. The armature is of laminated construction and includes a pair of side plates also of T-configuration but having a pair of extensions 32 which are best seen in FIG. 2. The ends of the extensions are turned substantially at right angles to the remaining portions of the extensions and extend inwardly towards each other.

Also provided in the abutment housing 12 but extending a substantial distance into a circular recess defined in the insert 17, is a circular abutment disc 33. The disc 33 is provided with a peripheral step with which engages a coiled compression spring 34 and the abutment disc 33 is also provided with an integral stem 35 which supports an integral head 36. The head defines overhanging portions which engage with the inwardly turned end portions of the extensions 32. Moreover, the distance between the head 36 and the main portion of the abutment disc is such that continued movement of the armature can occur into contact with the stops 31, after the movement of the abutment disc has been halted. The abutment disc is positioned to engage with the end of the valve stem 23. Moreover, the abutment disc is formed from synthetic resin material.

In operation, when the winding 28 is supplied with current the armature is moved upwardly and in so doing the end portions of the extensions 32 engage the head 36 and lift the abutment disc 33 against the action of the spring 34. The valve member is then free to move from the position shown in FIG. 1 to the position shown in FIG. 2, under the action of the air pressure in the inlet port 14. When the flow of current in the winding ceases the spring 34 returns the abutment disc together with the valve assembly to the position shown in FIG. 1. At some point during the return motion movement of the disc and valve member is halted by the abutment of the valve member with the seat. The armature 29 can, however, continue its movement towards the valve assembly until it is halted by the stops 31. The invention gained by the armature during its movement is therefore absorbed by the stops and not by the valve assembly. This prolongs the life of the valve assembly.

I claim:

1. A fluid control valve of the kind specified comprising a T-shaped armature, said armature having side plates, extensions on said side plates which extend beyond the head of the armature, the end portions of said extensions extending substantially at right angles to the remaining portions of the extensions, a spring abutment movable in the housing, a coiled compression spring defining said resilient means, said spring engaging said abutment to urge the abutment into contact with a stem on the valve member thereby to urge the valve member into contact with the seating defined about said one aperture, means carried by the abutment and engageable by the end portions of said extensions when in use electric current is supplied to a solenoid forming part of said electromagnetic means, the flow of current in the solenoid causing the armature to move the abutment in a direction away from the valve member to allow the valve member to be displaced by the air pressure, and stop means defined in the housing and which arrests the movement of the armature towards the valve member when the flow of electric current in the solenoid ceases.

2. A control valve as claimed in claim 1 in which said end portions of the extensions are turned inwardly towards each other.

3. A control valve as claimed in claim 2 in which said means carried by the abutment comprises a stem formed integrally with the abutment and a head formed on the stem, the thickness of said end portions of the extensions in relation to the distance between the head and the main body portion of the abutment being such that continued movement of the armature into contact with the stop can occur after the movement of the valve member and abutment has been arrested.

4. A control valve as claimed in claim 1, in which said stop means comprises a pair of stop surfaces engageable by the head of the armature.

* * * * *